(12) United States Patent
Lin

(10) Patent No.: US 9,605,648 B1
(45) Date of Patent: Mar. 28, 2017

(54) AIR-BLOWER DUAL-ENERGY-EXTRACTION WAVE AND TIDAL POWER GENERATION DEVICE AND AIR-BLOWER DUAL-ENERGY-EXTRACTION WAVE AND TIDAL POWER GENERATION SYSTEM

(71) Applicant: Ming-Hung Lin, Taipei (TW)

(72) Inventor: Ming-Hung Lin, Taipei (TW)

(*) Notice: Subject to any disclaimer, the term of this patent is extended or adjusted under 35 U.S.C. 154(b) by 0 days.

(21) Appl. No.: 14/936,865

(22) Filed: Nov. 10, 2015

(51) Int. Cl.
  *F03B 13/00* (2006.01)
  *F03B 13/18* (2006.01)
  *H02K 7/18* (2006.01)

(52) U.S. Cl.
  CPC ........ F03B 13/187 (2013.01); F03B 13/1855 (2013.01); H02K 7/1823 (2013.01)

(58) Field of Classification Search
  CPC .................................................. F03B 13/262
  USPC .......................................................... 290/53
  See application file for complete search history.

(56) References Cited

U.S. PATENT DOCUMENTS

| | | | | |
|---|---|---|---|---|
| 1,523,031 A | * | 1/1925 | Mitchell, Jr. | ......... F03B 13/262 405/76 |
| 4,208,878 A | * | 6/1980 | Rainey | ......... F03B 13/262 290/53 |
| 4,594,853 A | * | 6/1986 | Raichlen | ............... F03B 13/187 417/331 |
| 5,929,531 A | * | 7/1999 | Lagno | ................... F03B 13/262 290/42 |
| 7,511,386 B2 | * | 3/2009 | Lin | ....................... F03B 13/262 290/42 |
| 7,677,269 B2 | * | 3/2010 | Lin | ....................... G05D 16/10 138/26 |

FOREIGN PATENT DOCUMENTS

SU 681211 A1 * 8/1979

* cited by examiner

*Primary Examiner* — Joseph Waks
(74) *Attorney, Agent, or Firm* — Rosenberg, Klein & Lee

(57) ABSTRACT

An air-blower dual-energy-extraction wave and tidal power generation device includes an air blower mechanism, a first conduit, a second conduit, four check valves, a bracket, and a power generation mechanism, wherein waves and tides boost a push member of the air blower mechanism to drive a piston of the air blower mechanism to operate for drawing in gas or liquid, dual energies, by the first conduit and the second conduit to gain double efficiency, and the gas or liquid is stored in a gas accumulation, constant-pressure, and pressure-regulating barrel for subsequent release of the gas or liquid, in a stable and constant manner, to drive a vane wheel power generator to rotate for generation of electrical energy. Furthermore, the invention provides an air-blower dual-energy-extraction wave and tidal power generation system, which includes a plurality of air-blower dual-energy-extraction wave and tidal power generation device for generation of electrical energy.

19 Claims, 7 Drawing Sheets

AIR-BLOWER DUAL-ENERGY-EXTRACTION WAVE AND TIDAL POWER GENERATION DEVICE AND AIR-BLOWER DUAL-ENERGY-EXTRACTION WAVE AND TIDAL POWER GENERATION SYSTEM

FIELD OF THE INVENTION

The present invention relates to an air-blower wave and tidal power generation device by extracting dual energies and a system thereof, and in particular to a device that comprises an air blower mechanism having a piston that is driven by tides to move so that the operation of the piston draws in gas or liquid to be accumulated in a gas accumulation, constant-pressure, and pressure-regulating barrel for subsequent release of the pressure of the gas or liquid to a vane wheel for rotation to generate electrical energy and is applicable to a power generation device or the likes that are operable in various sea areas for extracting energy from tides and waves and can be modularized so as to successively extract the kinetic energy of tides and waves with a simple arrangement without relying on mechanical structure.

BACKGROUND OF THE INVENTION

The prices of oil is increasingly rising and the global storage of oil is increasing lowering, while the global demand of oil consumption is increased year by year. Nowadays, tidal power generation is being developed in numerous countries, such as Japan and European states. Tidal power generation is conversion of kinematic energy of tides and waves into electrical energy by using a tidal power generator. According to the estimation proposed by experts, if an amount of less than 5% of the energy of tides and waves of the world is converted into electrical power, an amount of energy that is surprisingly far beyond imagination can be obtained. However, it is a shame that there has been no technical breakthrough for two to three centuries to make it commercialized.

Taiwan is an island and the island owns a coastal line of 1,448 kilometer in total. The coastal area has constantly blowing winds, which are strong and powerful and consistently cause uninterrupted waves and tides on the wide span of sea. Such tides and waves carry energy that is a remarkable amount of renewable energy supply. Thus, it is an ultimate goal for researchers of ocean engineering to effectively make use of the energy entraining the waves and tides to generate electrical energy.

The present inventor has devoted himself in the study of tidal power generation for more than a decade and has been previously issued of Taiwan Invention Patent I313319 and U.S. Pat. No. 7,511,386 B2, related to an "Air-Blower Tidal Power Generation Device", which comprises a rack, an air-blower mechanism arranged on the rack at a predetermined location and comprising an extendible cylinder, a buoy mounted at one end of the extendible cylinder, and a conduit mounted to an opposite end of the extendible cylinder, the buoy having a bottom positioned on sea surface; a power generation mechanism comprising a storage canister and a power generator having an air-driven motor, the storage canister being connected to and in communication with the conduit. As such, the movement of tides drive the air-blower mechanism to directly use the kinematic energy of the up and down movement of the tide for drawing in and accumulating gas in the storage canister and gas pressure is then allowed to be released to drive the power generator involving the air-driven motor thereby forming an air-blower tidal power generation device, wherein sea surface that repeatedly moves up and down creates tides and waves that involve a great difference in height and provide different tide or wave levels and the power of the tides and waves repeatedly drives the air-blower mechanism so that tides and waves of any size and height can be used to draw in and accumulate gas in the canister to thereby obtain a stable and rich supply of gas for driving the air-driven motor and thus rotating the air-driven motor for generating electrical power. An air-blower tidal power generation device that requires no complicated and large-scale facility as conventionally used and is structured with a simple arrangement can be achieved to thereby lower down the cost and installation time and ensures easy maintenance.

Such a known air-blower tidal power generation device, although greatly simplifying the traditional complicated large-scale mechanical facility, involves an extendable cylinder that can extract energy with only one stroke of a reciprocal air-drawing movement thereof, making it not possible to use both forward and backward strokes of the air drawing cycle in a more efficient manner. Further, such a known air-blower tidal power generation device is only operable by drawing in gas as a power source for generating electrical energy, making it hard to improve the efficiency of the power generator. Thus, the durability and practicability of use of such a known device are poor.

Thus, the present invention aims to improve the above-discussed drawbacks by providing a novel air-blower tidal power generation device through dual energy extraction and a system thereof.

SUMMARY OF THE INVENTION

In view of the above, the present invention provides an air-blower dual-energy-extraction wave and tidal power generation device, which comprises an air blower mechanism, a first conduit, a second conduit, four check valves, a bracket, and a power generation mechanism. The air blower mechanism comprises a housing, a piston, a connecting rod, and a push member. The housing comprises a first opening, a second opening, and a third opening. The piston is arranged in the housing and defines an upper chamber and a lower chamber in the housing. The connecting rod has a first end connected to the piston in the lower chamber. The push member is arranged outside the housing and connected to a second end of the connecting rod. The first conduit comprises a first aperture, a second aperture, a third aperture, and a fourth aperture. The first aperture is connected to and in communication with the first opening. The second aperture is connected to and in communication with the second opening. The third aperture receives and draws in gas or liquid. The second conduit has a first end connected to and in communication with the third opening and a second end receiving and drawing in gas or liquid. The four check valves are respectively arranged in the first conduit and the second conduit. The bracket supports the air blower mechanism thereon to allow the push member to move with respect to the bracket. The power generation mechanism comprises a gas accumulation, constant-pressure, and pressure-regulating barrel and a vane wheel power generator. As such, the push member of the air blower mechanism can be driven by tides and waves to move so that the piston may drawn gas or liquid into the upper chamber and the lower chamber and the gas and liquid may then be accumulated in the gas accumulation, constant-pressure, and pressure-regulating barrel for subsequent release to drive the vane wheel power generator to rotate for generating electrical energy. Further, the present invention also provides an air-blower dual-energy-extraction wave and tidal power generation system that combines multiples ones of the air-blower dual-energy-extraction wave and tidal power generation.

As such, the present invention provides an air-blower dual-energy-extraction wave and tidal power generation device and a system thereof that are operable, according to the environmental conditions of the site where a user is located, to draw in liquid or gas as a power source for generating electrical energy. Particularly, when liquid, such as seawater, is drawn in to serve as a power source for generation of electrical energy, since the density of water is more than 800 times larger than that of gas, using seawater that has a high density to drive a vane wheel power generator would provide an increased efficiency of electrical power generation. Further, due to the movement of the piston, both forward and backward strokes can be employed to achieve a dual effect of extracting energy from liquid or gas and outputting the energy, thereby further improving the efficiency of electrical power generation. Thus, the present invention can be employed to provide economic values in low wave areas (such as Taiwan and Asian seas) and may be moved to a high wave area (such as Atlantic ocean) to multiple the value thereof by more than ten times.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

It is first noted here that the terms "upper chamber" and "lower chamber" as used herein (including the claims) refer to location with respect to the sea surface in the vertical direction and that close to the sea surface is the lower chamber, while that distant from sea surface is the upper chamber.

Figure 1A:
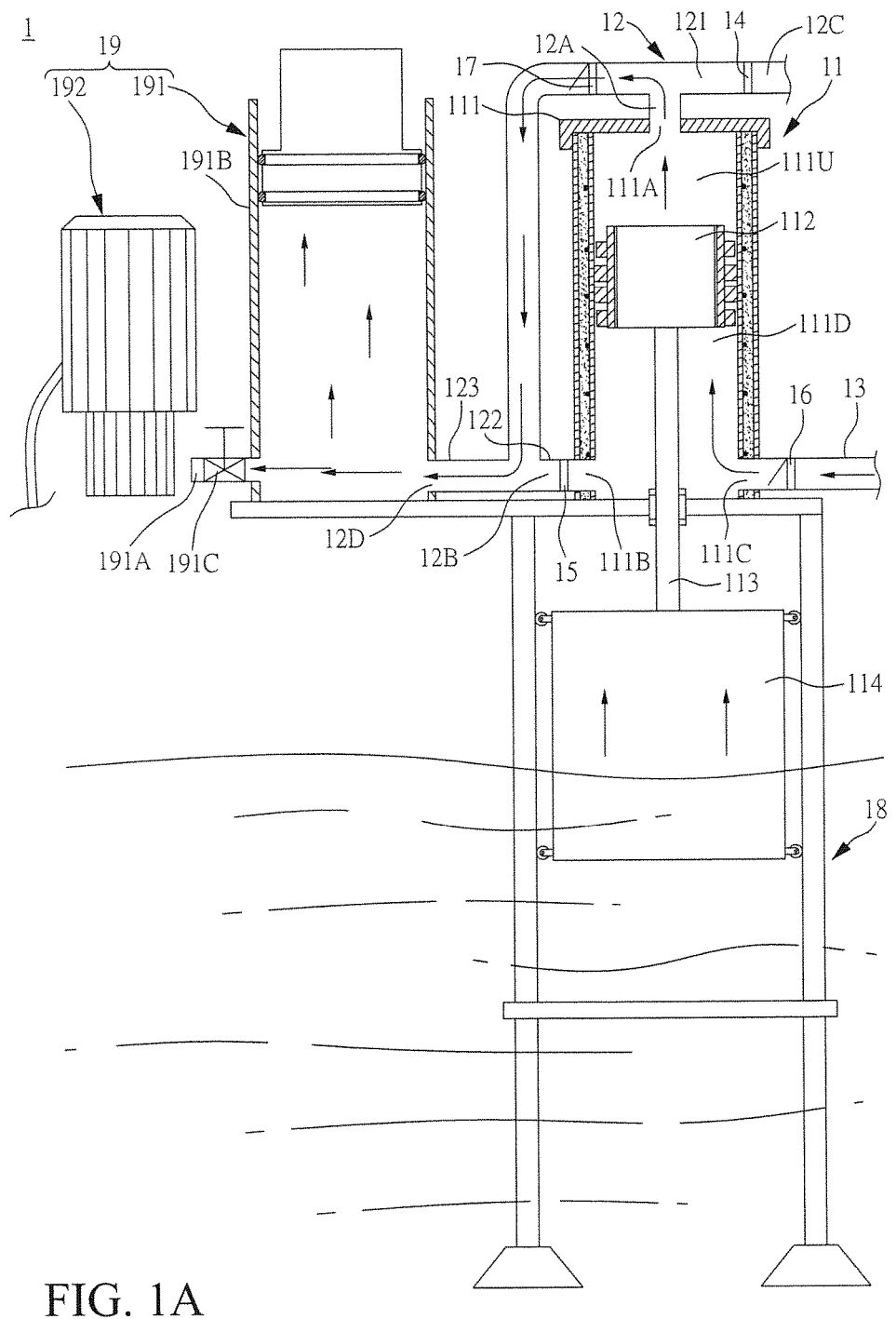
FIGS. 1A, 1B, and 1C are respectively a cross-sectional view of an air-blower dual-energy-extraction wave and tidal power generation device according to the present invention, a schematic view illustrating an operation of the device, and a perspective view illustrating an air blower of the device mounted on a bracket.
Figure 1B:
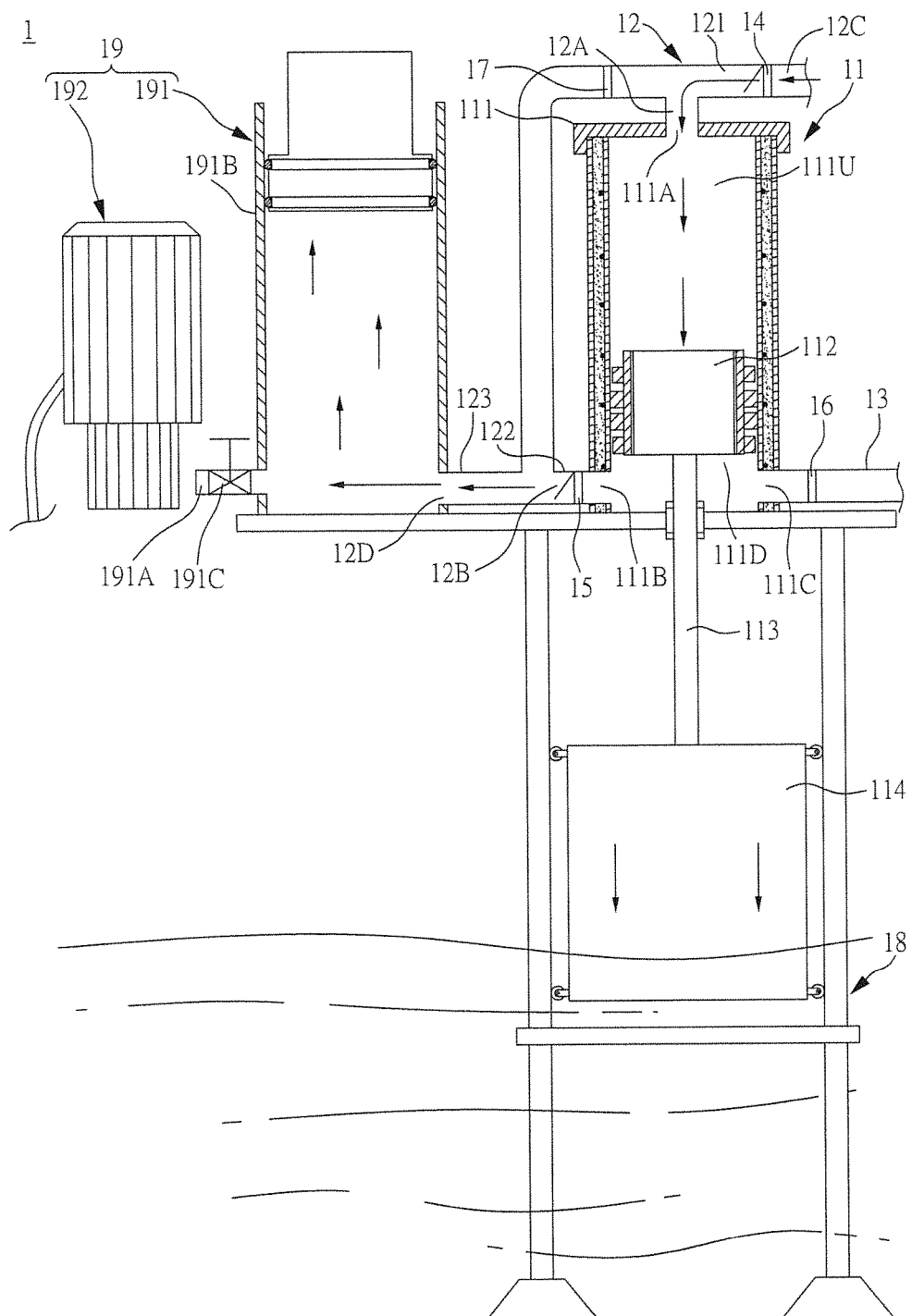
Figure 1C:
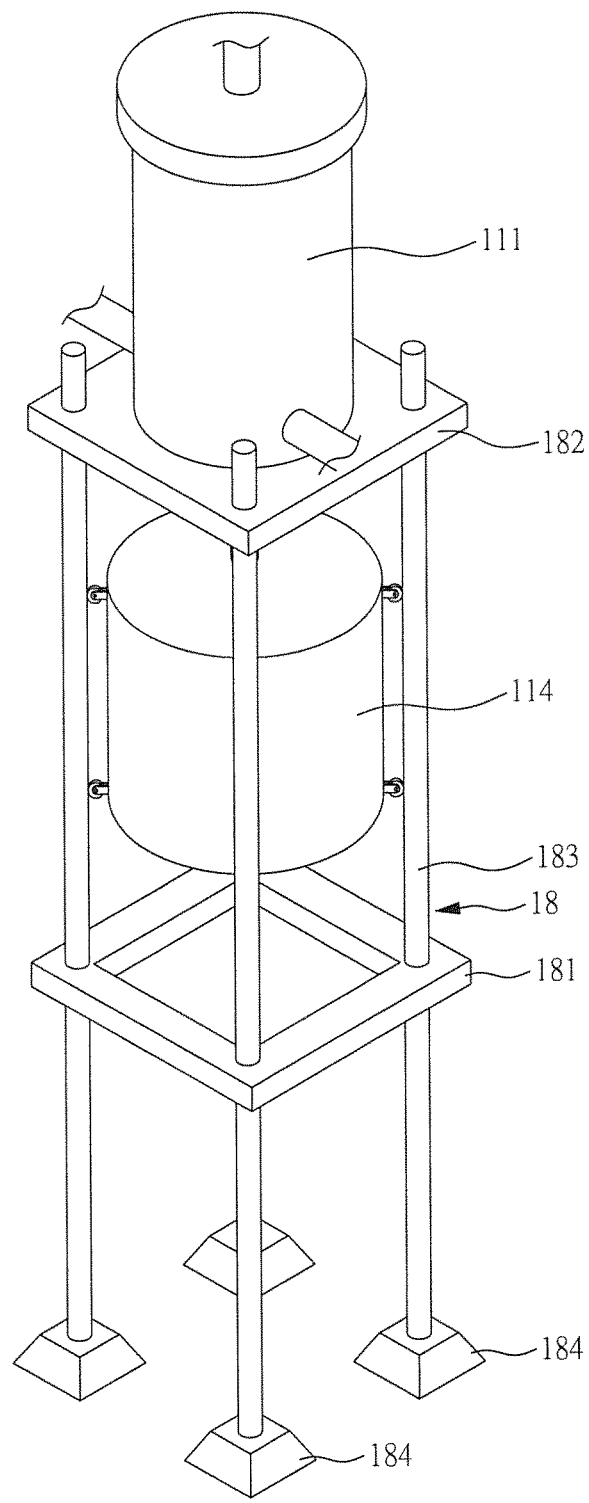

Referring to FIGS. 1A, 1B, and 1C, which are respectively a cross-sectional view of an air-blower dual-energy-extraction wave and tidal power generation device according to the present invention, a schematic view illustrating an operation of the device, and a perspective view illustrating an air blower of the device mounted on a bracket, the present invention discloses an air-blower dual-energy-extraction wave and tidal power generation device 1, which comprises an air blower mechanism 11, a first conduit 12, a second conduit 13, a first check valve 14, a second check valve 15, a third check valve 16, a fourth check valve 17, a bracket 18, and a power generation mechanism 19. The air blower mechanism 11 comprises a housing 111, a piston 112, a connecting rod 113, and a push member 114. The housing 111 comprises a first opening 111A, a second opening 111B, and a third opening 111C. The piston 112 is arranged in the housing 111 and defines an upper chamber 111U and a lower chamber 111D in the housing 111. The connecting rod 113 has a first end connected to the piston 112. The push member 114 is arranged outside the housing 111 and is connected to a second end of the connecting rod 113. The first conduit 12 comprises a first aperture 12A, a second aperture 12B, a third aperture 12C, and a fourth aperture 12D. The first aperture 12A is connected to and in communication with the first opening 111A of the housing 111; the second aperture 12B is connected to and in communication with the second opening 111B of the housing 111; and the third aperture 12C receives and draws in gas or liquid. The second conduit 13 has a first end connected to and in communication with the third opening 111C and a second end receiving and drawing in gas or liquid. The first check valve 14 is arranged in the first conduit 12 and between the first aperture 12A and the third aperture 12C. The second check valve 15 is arranged in the first conduit 12 at the second aperture 12B. The third check valve 16 is arranged in the second conduit 13. The fourth check valve 17 is arranged in the first conduit 12 and between the first aperture 12A and the second check valve 15 and the fourth aperture 12D. The bracket 18 supports the air blower mechanism 11 thereon in such a way that the push member 114 of the air blower mechanism 11 is allowed to move on and with respect to the bracket 18. The power generation mechanism 19 comprises a gas accumulation, constant-pressure, and pressure-regulating barrel 191 and a vane wheel power generator 192. The gas accumulation, constant-pressure, and pressure-regulating barrel 191 is connected to and in communication with the fourth aperture 12D of the first conduit 12 to receive and accumulate therein gas or liquid and comprises a third conduit 191A. The vane wheel power generator 192 is arranged beside the third conduit 191A of the gas accumulation, constant-pressure, and pressure-regulating barrel 191. As such, the push member 114 of the air blower mechanism 11 is arranged to be driven by tides and waves to move so as to drive the piston 112 to draw in and introduce gas or liquid into the upper chamber 111U and the lower chamber 111D so that gas or liquid may then be accumulated and stored in the gas accumulation, constant-pressure, and pressure-regulating barrel 191 for being subsequently released to and driving the vane wheel power generator 192 to rotate for generation of electrical energy.

Further, as shown in FIGS. 1A and 1B, the first conduit 12 is in the form of a curved T-shaped tube, which comprises a first tubular section 121, a second tubular section 122, and a third tubular section 123. The first tubular section 121 is a curved tube and has a first end through which gas or liquid is received. The second tubular section 122 has a first end connected to and in communication with a second end the first tubular section 121 and a second end connected to and in communication with the second opening 111B of the housing 111. The third tubular section 123 has a first end connected to and in communication with the second end of the first tubular section 121 and a second end connected to and in communication with the gas accumulation, constant-pressure, and pressure-regulating barrel 191. The first aperture 12A is formed in a side wall of the first tubular section 121; the second aperture 12B and the fourth aperture 12D are respectively located at the second ends of the second tubular section 122 and the third tubular section 123; and the third aperture 12C is located at the first end of the first tubular section 121.

Figure 2:
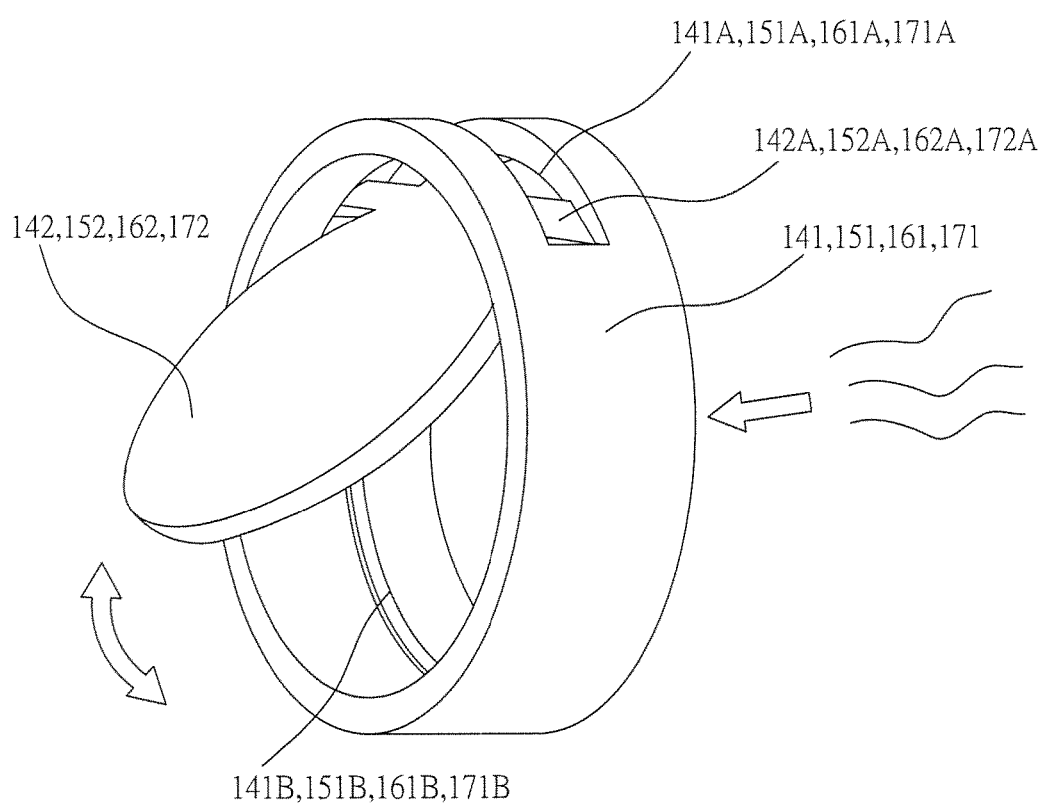
FIG. 2 is a schematic view illustrating the structure of a check valve according to the present invention.

Referring to FIG. 2, a schematic view is given to illustrate the structure of the check valves according to the present invention. The first check valve 14 and the fourth check valve 17 are mounted to the first tubular section 121 of the T-shaped tube; and the second check valve 15 is mounted to the second tubular section 122 of the T-shaped tube. The first check valve 14, the second check valve 15, the third check valve 16, and the fourth check valve 17 each comprise an annular member 141, 151, 161, 171 and a plate member 142, 152, 162, 172. The annular member 141, 151, 161, 171 has a circumferential wall in which a hole 141A, 151A, 161A, 171A is formed. The plate member 142, 152, 162, 172 comprises a retention section 142A, 152A, 162A, 172A and the retention section 142A, 152A, 162A, 172A is movably and partly supported in two ends of the hole 141A, 151A, 161A, 171A of the annular member 141, 151, 161, 171 to form a check valve arrangement that allows for passage in a predetermined direction. Further, the annular member 141, 151, 161, 171 of the first check valve 14, the second check valve 15, the third check valve 16, and the fourth check valve 17 has an inner surface on which a circumferential projection 141B, 151B, 161B, 171B is formed to allow the annular member 141, 151, 161, 171 and the plate member 142, 152, 162, 172 to get in tight engagement with each other.

Further, as shown in FIG. 1C, in an actual application, the air-blower dual-energy-extraction wave and tidal power generation device 1 according to the present invention is arranged in sea and the bracket 18 comprises and is supported on a base 181, which can be selectively added with a support foundation 184 according to the marine condition. The bracket 18 comprises the base 181 and a top seat 182 and the base 181 and the top seat 182 are connected to at least one support 183 arranged therebetween to allow the push member 114 of the air blower mechanism 11 to selectively slide on and along the at least one support 183. The air-blower dual-energy-extraction wave and tidal power generation device 1 is installed in such a way that a bottom of the push member 114 of the air blower mechanism 11 is positioned on and in contact with the sea surface so that the push member 114 can be moved by the tides or waves of the sea to drive the piston 112 of the air blower mechanism 11 for generating a negative pressure inside the housing 111 to draw gas or liquid into the upper chamber 111U or the lower chamber 111D. Further, the bracket 18 is of a movable structure, which allows the air-blower dual-energy-extraction wave and tidal power generation device 1 according to the present invention to be moved to a suitable location in the sea for easy application in various conditions, or to be directly mounted in the sea. Further, the air-blower dual-energy-extraction wave and tidal power generation device 1 may be mounted on a vessel. The vessel may be moved to a desired sea area in order to obtain a higher level of tidal energy. In case of hurricanes or poor weather, the vessel may be moved back to a harbor or port. In this way, the present invention may be used in various conditions and various sea tides to extract more energy.

Further, as shown in FIG. 1A, when tides move the push member 114 of the air blower mechanism 11 upward, the piston 112 of the air blower mechanism 11 is driven upward to cause a negative pressure space induced in the lower chamber 111D of the housing 111 so that liquid or gas may be drawn through the second end of the second conduit 13 in to the lower chamber 111D of the housing 111 of the air blower mechanism 11. The negative pressure acts on the plate member 152 of the second check valve 15 so as to set the second check valve 15 in a closed condition. Meanwhile, the piston 112 of the air blower mechanism 11 is forced to move upward and reduces the interior space of the upper chamber 111U so that the liquid or gas contained in the upper chamber 111U is compressed and an increased pressure is induced and moves the plate member 172 of the fourth check valve 17 to an open condition, whereby the liquid or gas contained in the upper chamber 111U is driven to flow through the third tubular section 123 into the gas accumulation, constant-pressure, and pressure-regulating barrel 191. Further, the plate member 142 of the first check valve 14 is driven by the liquid or gas to a closed condition so as to prevent the liquid or gas contained in the upper chamber 111U from leaking through the first end of the first tubular section 121.

Further, as shown in FIG. 1B, when the push member 114 of the air blower mechanism 11 is caused by the gravity thereof to move downward, the piston 112 of the air blower mechanism 11 is moved downward so that a negative pressure space is induced in the upper chamber 111U of the housing 111, whereby liquid or gas is drawn through the first end of the first tubular section 121 of the first conduit 12 into the upper chamber 111U of the housing 111 of the air blower mechanism 11 and the negative pressure acts on the plate member 172 of the fourth check valve 17 to set the fourth check valve 17 in a closed condition. At the same time, the piston 112 of the air blower mechanism 11 is moved downward to reduce the interior space of the lower chamber 111D so that liquid or gas contained in the lower chamber 111D is compressed and the plate member 152 of the second check valve 15 is driven to an open condition, whereby the liquid or gas contained in the lower chamber 111D is driven to flow through the second tubular section 122 and the third tubular section 123 of the first conduit 12 into the gas accumulation, constant-pressure, and pressure-regulating barrel 191. Further, the plate member 162 of the third check valve 16 is driven by the liquid or gas to a closed condition so as to prevent the liquid or gas contained in the lower chamber 111C from leaking through the second end of the second conduit 13.

When gas or liquid enters the gas accumulation, constant-pressure, and pressure-regulating barrel 191, either the second check valve 15 or the fourth check valve 17 resumes the closed condition because the pressure of gas or liquid acting thereon vanishes so that the gas or liquid can be accumulated in the gas accumulation, constant-pressure, and pressure-regulating barrel 191 and the gas or liquid is prevented from escaping.

The gas accumulation, constant-pressure, and pressure-regulating barrel 191 has a barrel body 191B that is provided with a regulation switch 191C for regulating an output flow of liquid or gas so that gas or liquid stored in the gas accumulation, constant-pressure, and pressure-regulating barrel 191 may be supplied, under a constant pressure, to the vane wheel power generator 192, and thus, the gas accumulation, constant-pressure, and pressure-regulating barrel 191 may release, in a stable and constant manner, gas to the vane wheel power generator 192. As such, the push member 114 of the air-blower dual-energy-extraction wave and tidal power generation device 1 drives the piston 112 to operate for drawing in gas or liquid and the gas or liquid is stored in the gas accumulation, constant-pressure, and pressure-regulating barrel 191 for subsequent release of the gas or liquid, in a stable and constant manner, to drive the vane wheel power generator 192 to rotate for generation of electrical energy.

Figure 3:
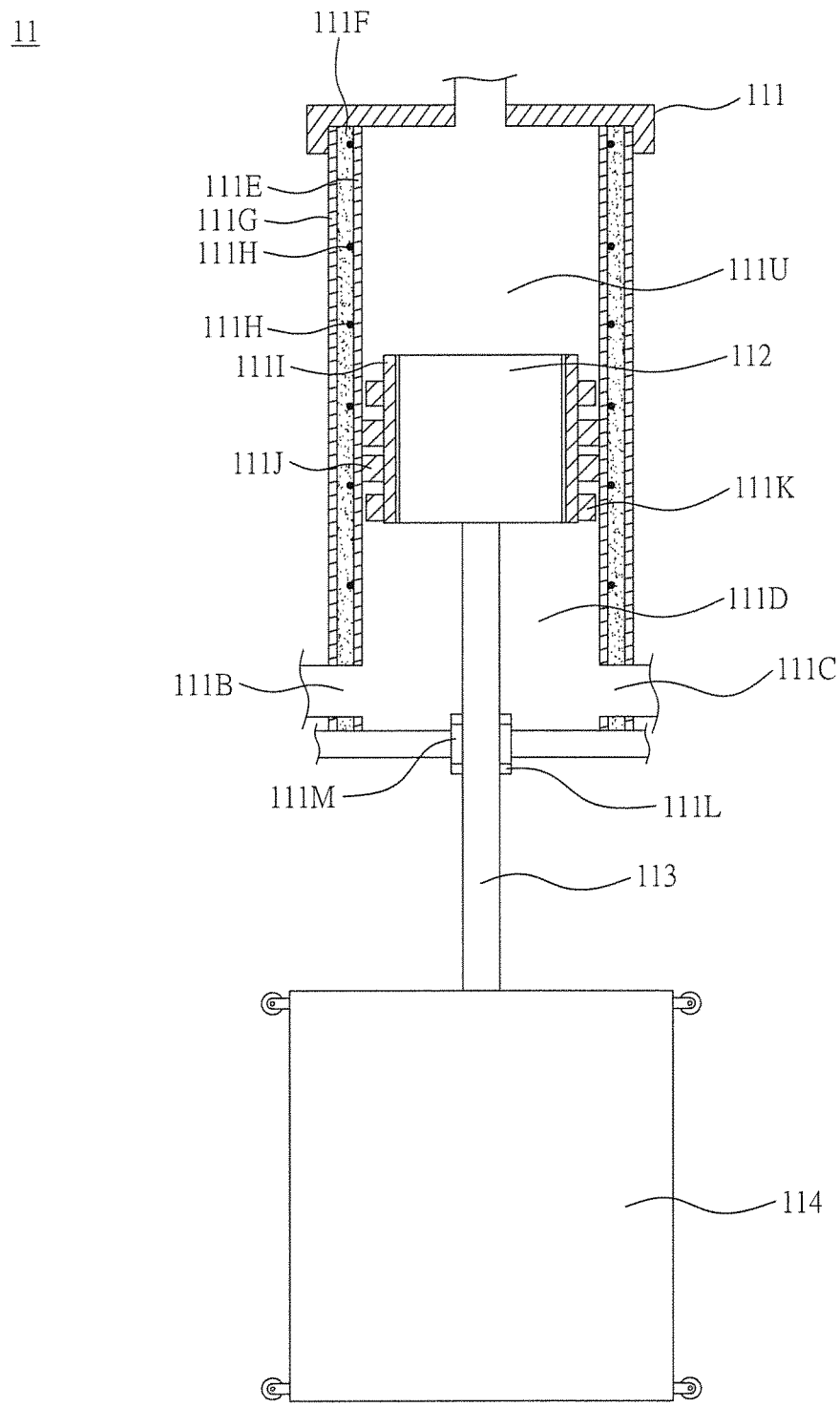
FIG. 3 is a cross-sectional view illustrating an air blower according to the present invention.

Referring to FIG. 3, a cross-sectional view is given to illustrate the structure of the air blower according to the present invention. The air blower mechanism 11 is operable by means of a relatively movable engagement between the piston 112 and the housing 111. Further, the housing 111 is constantly in contact with gas or liquid and thus is necessary to meet the requirement of lightweight, pressure resistance, wear resistance, and having a low friction coefficient. The housing 111 of the air blower mechanism 11 has an inside surface that comprises a metallic layer 111E, an epoxy resin layer 111F, and a plastic sheet layer 111G. The metallic layer 111E, which serves as an inner lining, is a metal plate that is smooth and is resistant to wear and corrosion induced by seawater (and is made of stainless steel, which is taken as an example in the instant embodiment). The metallic layer 111E has an outside surface that is circumferentially surrounded by the epoxy resin layer 111F in which a plurality of shaping frames 111H is arranged to help shape the metallic layer 111E of the housing. The epoxy resin layer 111F has an outside surface that is circumferentially covered by the plastic sheet layer 111G (which can be a polycarbonate (PC) sheet that serves as an example in the instant embodiment). The metallic layer 111E is provided, on the outside surface thereof, with the plurality of shaping frames 111H to help shape the metallic layer 111E of the inside surface of the housing 111 and epoxy resin is filled between the metallic layer 111E and the plastic sheet layer 111G to construct a sandwich like structure. As such, the requirement for lightweight, pressure resistance, wear resistance, and having a low friction coefficient can be met.

The metallic layer 111E of the housing 111 has an inside surface that is in movable engagement with the piston 112. A gas closure cap 111I is fit or arranged at the movable engagement between the inside surface of the metallic layer 111E and the piston 112 of the housing 111. The gas closure cap 111I is preferably aluminum casting and is provided with one or more gasket rings 111J for preventing leakage of gas. The gas closure cap 111I is provided, at locations above and below the gasket ring 111J with wear-resistant positioning pins 111K to guide stable movement of the piston 112 within the housing 111.

Further, the housing 111 of the air blower mechanism 11 further comprises a seal ring 111L and a bearing 111M mounted on the housing 111 to receive extension of the connecting rod 113 through the seal ring 111L and the bearing 111M in a movable manner so as to confine the movement of the connecting rod 113 to a linear motion.

Further, the first tubular section 121 of the first conduit 12 and the second conduit 13 of the air-blower dual-energy-extraction wave and tidal power generation device 1 of the present invention may be arranged in seawater to draw in seawater as a power source for generating electrical energy. Alternatively, the first tubular section 121 of the first conduit 12 and the second conduit 13 of the air-blower dual-energy-extraction wave and tidal power generation device 1 of the present invention may be arranged in the atmosphere to draw in air as a power source for generating electrical energy.

Figure 4A:
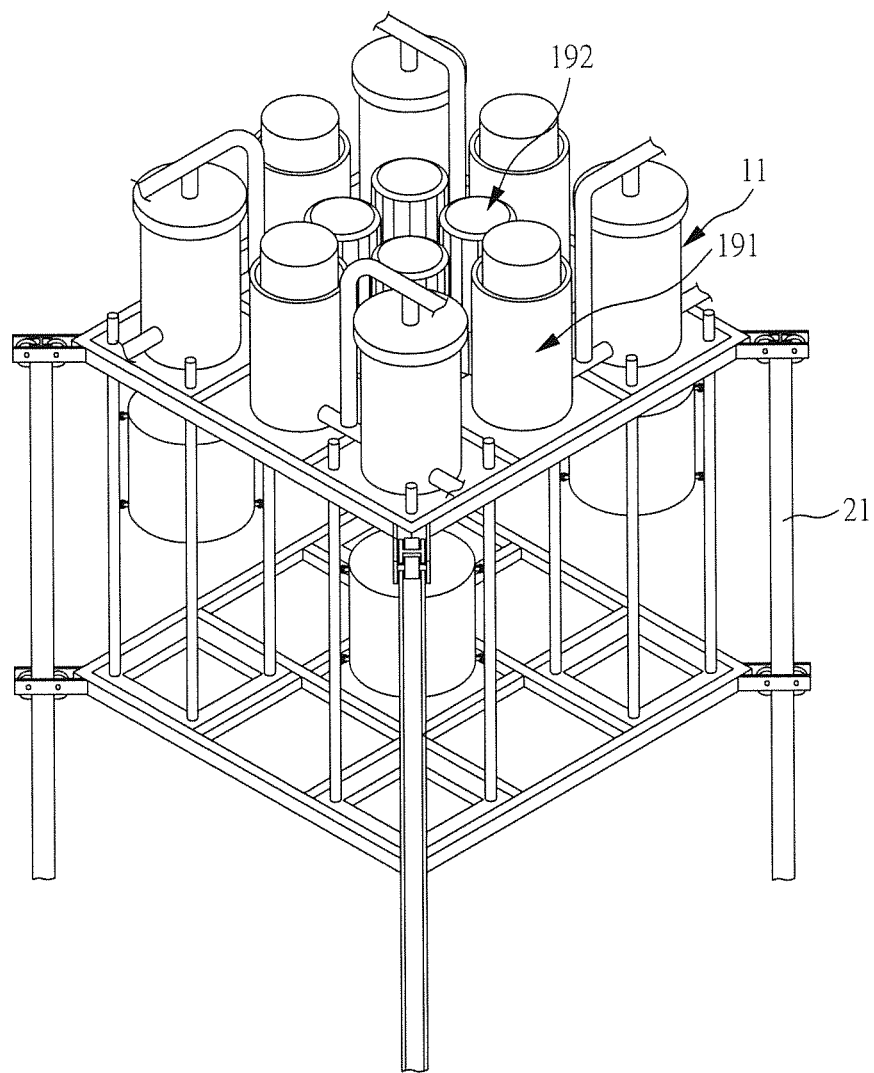
FIG. 4A is a schematic view illustrating an air-blower dual-energy-extraction wave and tidal power generation system according to the present invention.

Referring to FIG. 4A, a schematic view is given to illustrate an air-blower dual-energy-extraction wave and tidal power generation system 2 according to the present invention. As discussed above, the air-blower dual-energy-extraction wave and tidal power generation device 1 according to the present invention can be arranged as a stand-alone device mounted on the bracket 18 to generate electrical energy. However, in another embodiment of the present invention, multiple ones of the above-described air-blower dual-energy-extraction wave and tidal power generation device 1 can be arranged on a frame 21 to allow the multiple air-blower dual-energy-extraction wave and tidal power generation devices 1 to be operated by having tides and waves drive the push member 114 of the air blower mechanism 11 of individual ones of the devices so as to accumulate gas or liquid for subsequent release to each individual vane wheel power generator 192 for rotation and generating electrical energy. The operation of each of the devices is the same as that described above so that repeated illustration will be omitted.

Figure 4B:
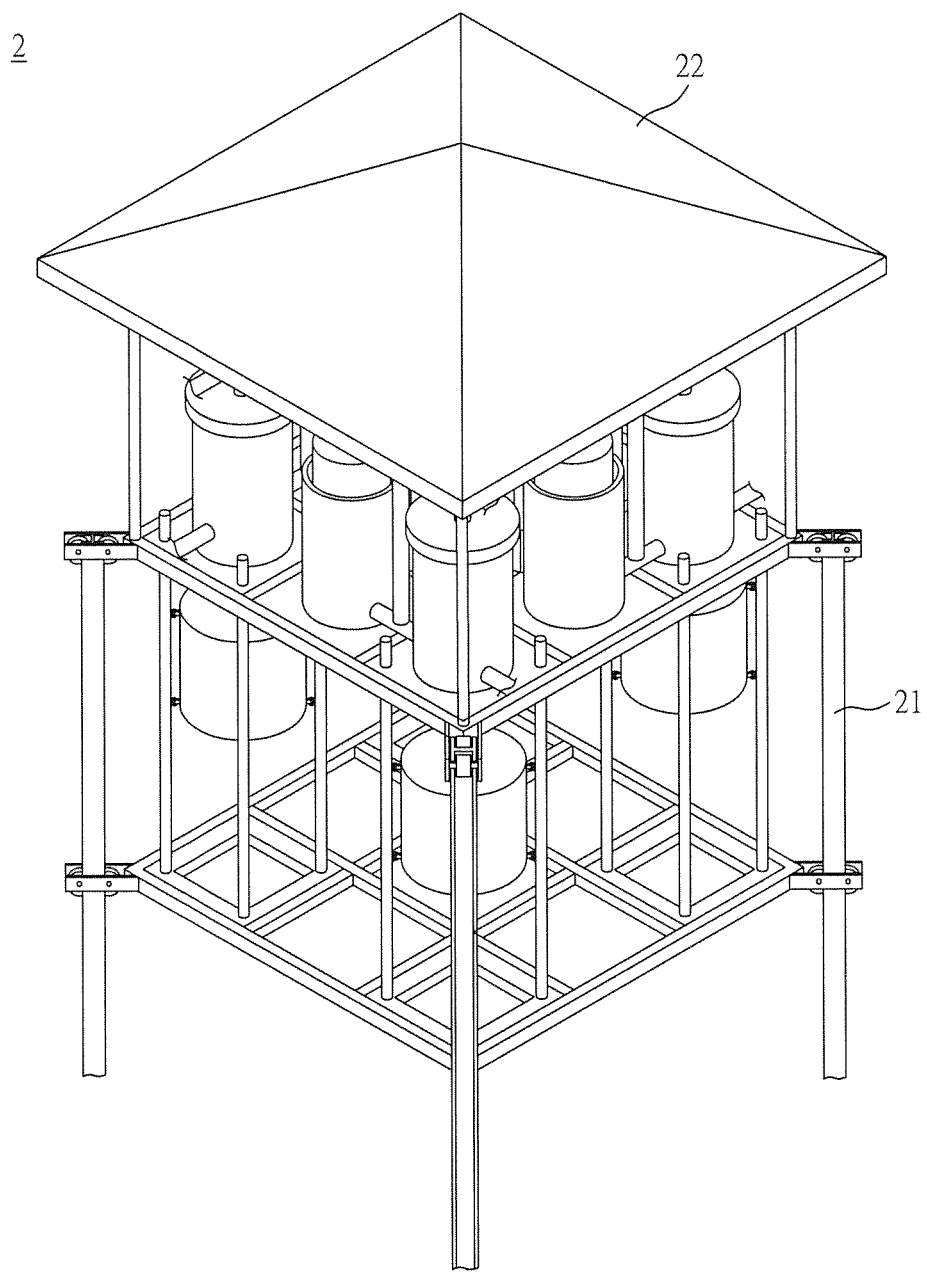
FIG. 4B is a schematic view illustrating the air-blower dual-energy-extraction wave and tidal power generation system according to the present invention shielded by a cover mounted thereto.

Referring to FIG. 4B, a schematic view is given to illustrate the air-blower dual-energy-extraction wave and tidal power generation system according to the present invention shielded by a cover mounted thereto. To protect each individual air-blower dual-energy-extraction wave and tidal power generation device 1 of the air-blower dual-energy-extraction wave and tidal power generation system 2 mounted on the frame 21 from corrosion caused by seawater, a cover 22 may be provided and mounted on the frame 21 for protection.

In summary, the present invention provides an air-blower dual-energy-extraction wave and tidal power generation device and a system thereof that are operable, according to the environmental conditions of the site where a user is located, to draw in liquid or gas as a power source for generating electrical energy. Particularly, when liquid, such as seawater, is drawn in to serve as a power source for generation of electrical energy, since the density of water is more than 800 times larger than that of gas, using seawater that has a high density to drive a vane wheel power generator would provide an increased efficiency of electrical power generation. Further, due to the movement of the piston, both forward and backward strokes can be employed to achieve a dual effect of extracting energy from liquid or gas and outputting the energy, thereby further improving the efficiency of electrical power generation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An air-blower dual-energy-extraction wave and tidal power generation device, comprising:
    an air blower mechanism, which comprises:
    a housing, which comprises a first opening, a second opening, and a third opening;
    a piston, which is arranged in the housing and defines an upper chamber and a lower chamber in the housing;
    a connecting rod, which has a first end connected to the piston; and
    a push member, which is arranged outside the housing and connected to a second end of the connecting rod;
    a first conduit, which comprises a first aperture, a second aperture, a third aperture, and a fourth aperture, the first aperture being connected to and in communication with the first opening of the housing, the second aperture being connected to and in communication with the second opening of the housing, the third aperture being adapted to receive gas or liquid;

a second conduit, which has a first end connected to and in communication with the third opening of the housing and a second end adapted to receive gas or liquid;

a first check valve, which is arranged in the first conduit between the first aperture and the third aperture;

a second check valve, which is arranged in the first conduit at the second aperture;

a third check valve, which is arranged in the second conduit;

a fourth check valve, which arranged in the first conduit between the first aperture and the second check valve and the fourth aperture;

a bracket, which supports the air blower mechanism thereon to allow the push member of the air blower mechanism to move with respect to the bracket; and a power generation mechanism, which comprises:

an gas accumulation, constant-pressure, and pressure-regulating barrel, which is connected to and in communication with the fourth aperture of the first conduit to receive and accumulate the gas or the liquid and comprises a third conduit; and a vane wheel power generator, which is arranged beside the third conduit of the gas accumulation, constant-pressure, and pressure-regulating barrel;

wherein the push member of the air blower mechanism is adapted to be driven by tides and waves to have the piston that is coupled to the push member selectively draw the gas or the liquid into the upper chamber and the lower chamber of the housing so that the gas or the liquid is accumulated and stored in the gas accumulation, constant-pressure, and pressure-regulating barrel for subsequent release to drive the vane wheel power generator to rotate for generating electrical energy;

wherein the housing of the air blower mechanism has an inside surface that comprises:

a metallic layer;

an epoxy resin layer, which is arranged on an outer surface of the metallic layer; and a plastic sheet layer, which is arranged on an outer surface of the epoxy resin layer;

wherein the metallic layer serves as an inner lining and a metallic layer receives the piston to slidably fit therein.

2. The air-blower dual-energy-extraction wave and tidal power generation device as claimed in claim 1, wherein the bracket comprises a base and a top seat, at least one the support connected between the base and the top seat to support the push member of the air blower mechanism to slide on and along the at least one support.

3. The air-blower dual-energy-extraction wave and tidal power generation device as claimed in claim 2, wherein the base is further provided with a support foundation.

4. The air-blower dual-energy-extraction wave and tidal power generation device as claimed in claim 1, wherein the metallic layer of the inside surface of the housing comprises a stainless steel layer.

5. The air-blower dual-energy-extraction wave and tidal power generation device as claimed in claim 1, wherein the metallic layer of the inside surface of the housing is provided, on the outer surface thereof, with a plurality of shaping frames to shape the metallic layer of the inside surface of the housing.

6. The air-blower dual-energy-extraction wave and tidal power generation device as claimed in claim 1, wherein the first check valve, the second check valve, the third check valve, and the fourth check valve each comprise:

an annular member, which comprises a circumferential wall in which a hole is formed; and a plate member, which comprises a retention section, the retention section being movably supported in two ends of the hole of the annular member to form a check valve arrangement that allows for passage in a predetermined direction.

7. The air-blower dual-energy-extraction wave and tidal power generation device as claimed in claim 6, wherein the annular member of each of the first check valve, the second check valve, the third check valve, and the fourth check valve has an inner surface on which a circumferential projection is formed to allow the annular member and the plate member to get in tight engagement with each other.

8. The air-blower dual-energy-extraction wave and tidal power generation device as claimed in claim 1, wherein a gas closure cap is arranged between the inside surface of the metallic layer and the piston of the housing, the gas closure cap being provided with a gasket ring to prevent leakage of gas or liquid.

9. The air-blower dual-energy-extraction wave and tidal power generation device as claimed in claim 8, wherein the gas closure cap is provided with wear-resistant positioning pins above and below the gasket ring.

10. The air-blower dual-energy-extraction wave and tidal power generation device as claimed in claim 1, wherein the gas accumulation, constant-pressure, and pressure-regulating barrel comprises a barrel body that is provided with a regulation switch.

11. The air-blower dual-energy-extraction wave and tidal power generation device as claimed in claim 1, wherein the first conduit is in the form of a curved T-shaped tube, which comprises:

a first tubular section, which is a curved tube and has a first end through which gas or liquid is received;

a second tubular section, which has a first end connected to and in communication with a second end the first tubular section and a second end connected to and in communication with the second opening of the housing; and a third tubular section, which has a first end connected to and in communication with the second end of the first tubular section and a second end connected to and in communication with the gas accumulation, constant-pressure, and pressure-regulating barrel;

wherein the first aperture is formed in a side wall of the first tubular section; the second aperture and the fourth aperture are respectively located at the second ends of the second tubular section and the third tubular section; and the third aperture is located at the first end of the first tubular section.

12. The air-blower dual-energy-extraction wave and tidal power generation device as claimed in claim 11, wherein the first check valve and the fourth check valve are mounted to the first tubular section of the T-shaped tube; and the second check valve is mounted to the second tubular section of the T-shaped tube.

13. The air-blower dual-energy-extraction wave and tidal power generation device as claimed in claim 11, wherein when tides move the push member of the air blower mechanism upward, liquid or gas is drawn through the second end of the second conduit into the lower chamber of the housing of the air blower mechanism and liquid or gas contained in the upper chamber is driven to flow through the first tubular section and the third tubular section of the first conduit into and accumulated in the gas accumulation, constant-pressure, and pressure-regulating barrel.

14. The air-blower dual-energy-extraction wave and tidal power generation device as claimed in claim 13, wherein when the push member of the air blower mechanism is caused by tides to move downward, liquid or gas is drawn through the first end of the first tubular section of the first conduit into the upper chamber of the housing of the air blower mechanism and the liquid or gas contained in the lower chamber is driven to flow through the second tubular section and the third tubular section of the first conduit into and accumulated in the gas accumulation, constant-pressure, and pressure-regulating barrel.

15. The air-blower dual-energy-extraction wave and tidal power generation device as claimed in claim 11, wherein the liquid is drawn in with the first tubular section of the first conduit and the second conduit placed in seawater.

16. The air-blower dual-energy-extraction wave and tidal power generation device as claimed in claim 11, wherein the gas is drawn in with the first tubular section of the first conduit and the second conduit placed in the atmosphere.

17. The air-blower dual-energy-extraction wave and tidal power generation device as claimed in claim 1, wherein the air blower mechanism further comprises a seal ring and a bearing mounted to the housing to receive extension of the connecting rod through the seal ring and the bearing in a movable manner.

18. An air-blower dual-energy-extraction wave and tidal power generation system, comprising:
   a plurality of air-blower dual-energy-extraction wave and tidal power generation devices each of which is claimed in claim 1 and is mounted on a frame;
   wherein the plurality of air-blower dual-energy-extraction wave and tidal power generation devices is each operable by having the push member of the air blower mechanism thereof driven by tides in order to accumulate gas or liquid for subsequent release to drive the vane wheel power generator to rotate for generating electrical energy.

19. The air-blower dual-energy-extraction wave and tidal power generation system as claimed in claim 18 further comprising a cover set on the frame to shield the plurality of air-blower dual-energy-extraction wave and tidal power generation devices.

\* \* \* \* \*